Patented July 1, 1941

2,247,756

UNITED STATES PATENT OFFICE 2,247,756

PROCESS FOR THE MANUFACTURE OF ALCOHOLS AND KETONES

Benjamin W. Howk, Wilmington, and Wilbur A. Lazier, New Castle, Del., assignors to E. I. du Pont de Nemours & Company, Wilmington, Del., a corporation of Delaware No Drawing. Application August 11, 1939, Serial No. 289,583

20 Claims. (Cl. 260—593)

This invention relates to a catalytic process and more particularly to a process for the manufacture of ketones and alcohols. More especially the invention relates to the synthesis of heptadecanone-7 and heptadecanol-7 from castor oil.

This application is a continuation-in-part of application Serial No. 56,084, filed December 24, 1935. In co-pending application Serial No. 56,084, there is described a dehydrogenation process for the conversion of octadecanediol-1,12 to the corresponding keto-octadecyl alcohol, which comprises heating the glycol under carefully controlled conditions with a ferrous metal dehydrogenation catalyst. The reaction is conducted so that but slightly more than the theoretical quantity of hydrogen is evolved from the reaction mixture, and the temperature employed is maintained below a maximum value of about 240° C. We have now discovered that exhaustive dehydrogenation of primary-secondary glycols provides a convenient and practicable method for the preparation of ketones containing one less carbon atom than the original glycol. In this process, dehydrogenation of both the primary and secondary carbinol groups is accompanied by elimination of carbon monoxide, which reaction is referred to herein as decarbonylation.

This invention has as an object the preparation of ketones from primary-secondary glycols. Another object is to provide a catalytic process for preparing ketones from primary-secondary glycols. Still another object is to provide a catalytic process for converting primary-secondary glycols having at least two carbon atoms contiguously between the carbinol groups to ketones containing one less carbon atom than the original glycol. A still further object is to provide a commercially practicable process for preparing ketones from compounds having a secondary carbinol group separated from a primary carbinol group or a group convertible by hydrogenation to a primary carbinol group by at least two carbon atoms in contiguous relation. A further object is to provide a process for converting castor oil through 12-hydroxystearin to heptadecanone-7. Another object is to convert castor oil through 12-hydroxystearin to heptadecanol-7. A final object is to convert castor oil through octadecanediol-1,12 to heptadecanone-7.

In the preferred embodiment the above objects are accomplished by heating a primary-secondary glycol in which the primary and secondary carbinol groups are separated by at least two carbon atoms in contiguous relation with a dehydrogenation catalyst at a temperature in excess of 150° C. The resulting ketone which contains one less carbon atom than the original glycol is then hydrogenated to the corresponding secondary alcohol at a temperature in excess of 150° C. and under a hydrogen pressure of about 1500 lbs. per sq. in.

The following examples set forth certain well-defined instances of the application of this invention. They are, however, not to be considered as limitations thereof, since many modifications may be made without departing from the spirit and scope of the invention. In the examples, parts are by weight unless otherwise stated.

Example I

A mixture consisting of 500 parts of technical octadecanediol-1,12 and 50 parts of an active nickel catalyst is charged into a reaction flask equipped with a temperature measuring device, a stirrer, and a gas outlet tube leading to a condenser, appropriate cold traps, and gas meter. The octadecanediol-1,12 is melted and the temperature gradually raised, with stirring, to about 185° C., at which temperature vigorous evolution of gas begins. The reaction is continued over a period of 4 to 4.5 hours while raising the temperature gradually to a maximum in the neighborhood of 270° C. At the end of this period the rate of gas evolution falls off to essentially zero, and the total amount given off corresponds to 2.67 moles of gas per mole of octadecanediol-1,12 charged to the reaction flask. The reaction mixture is cooled to approximately 150° C. and filtered to separate the catalyst. The catalyst is washed thoroughly with methanol, the methanol evaporated, and the residue added to the main filtrate. The product is refined by vacuum fractional distillation. There are obtained 53.7 parts of $C_{17}$ hydrocarbon, B. P. 140° to 143° C. at 4 mm., 323.2 parts of heptadecanone-7, B. P. 159° C. at 4 mm., M. P. 41° C., and 51.1 parts of high-boiling residue. The yield of heptadecanone-7 is 83.6% of theory based on the known octadecanediol-1,12 content of the technical product employed as starting material. Analysis gave: carbon, 80.31; hydrogen, 13.36.

$C_{17}H_{34}$ requires: carbon 80.30; hydrogen, 13.38.

Example II

One hundred fifty parts of technical grade octadecanediol-1,12 and 15 parts of an active nickel-on-kieselguhr catalyst are charged into a small high pressure autoclave. The autoclave is sealed and hydrogen is forced in until the total pressure at room temperature is about 450 to 500 lbs. per sq. in. Thereafter, the autoclave and its contents are maintained at a temperature of 250° C. over a period of 7 to 8 hours with vigorous agitation throughout the entire period. The autoclave is cooled to room temperature and accumulated gases purged. The reaction product is filtered to separate the catalyst and refined by vacuum fractional distillation according to the procedure described in Example I. There are obtained 6.9 parts of $C_{17}$ hydrocarbon, B. P. 140° to 145° C. at 4 mm., 84.4 parts of heptadecanone-7, B. P. 163° C. at 6 mm., and 14.5 parts of high-boiling residue. The heptadecanone-7 is essentially free from hydroxylated products, and the amount obtained corresponds to a molecular yield of 80.7% of theory, based on the pure octadecanediol-1,12 content of the technical starting material.

Example III

One hundred fifty parts of technical grade octadecanediol-1,12 is heated in a small high pressure autoclave with 15 parts of reduced nickel-on-kieselguhr catalyst under 1500 lbs. per sq. in. hydrogen pressure for a period of 7 to 8 hours. The product is separated from the reaction vessel and refined according to the procedure described in Example I. There are obtained 30.9 parts of $C_{17}$ hydrocarbon, 85.8 parts of a fraction, B. P. 155° to 158° C. at 4 mm., and 7.5 parts of high-boiling residue. The fraction, B. P. 155° to 158° C., at 4 mm., consists of a mixture of heptadecanol-7 and heptadecanone-7 in the approximate ratio 1:4. The yield of ketone-alcohol mixture is 82% of theory, calculated as indicated above in Examples I and II.

Example IV

One hundred fifty parts of ricinoleyl alcohol prepared by the sodium reduction of castor oil is hydrogenated in a small high pressure autoclave in the presence of 15 parts of active nickel catalyst under an initial hydrogen pressure of 1500 lbs. per sq. in. The reaction proceeds smoothly at a temperature of 150° to 160° C. and the absorption of hydrogen is complete within a period of about 30 minutes. At the end of the reaction the hydrogen pressure in the tube is approximately 400 to 500 lbs. per sq. in. Thereafter the reaction vessel and its contents are heated to a temperature of 250° C. and maintained at this level over a period of about 8 hours. The autoclave is cooled and the products removed and distilled under diminished pressure to give 35.1 parts of $C_{17}$ hydrocarbon boiling mainly at 140° to 148° C. at 6.5 mm., 66.6 parts of heptadecanone-7, B. P. 169° to 170° at 6.5 mm., and 7.4 parts of high-boiling residue. The heptadecanone-7 obtained is identical with that described in the foregoing examples.

Example V

One hundred fifty parts of ricinoleyl alcohol and 15 parts of nickel catalyst are placed in a round-bottomed, three-necked flask equipped as described in Example I. The reaction mixture is heated with stirring up to a temperature of 232° C. At this temperature a rapid evolution of gas begins and continues over a period of 2.75 hours, during which time the temperature is increased to a maximum of 250° C. The total volume of gas evolved corresponds to 1.66 moles per mole of ricinoleyl alcohol employed. The product is filtered to separate the catalyst and refined by vacuum fractional distillation. There is obtained 28.4 parts of $C_{17}$ hydrocarbon, 7 parts of an intermediate fraction, B. P. 160° to 171° C. at 7 mm., 51.8 parts of a $C_{17}$ ketone fraction, B. P. 171° C. at 7 mm., and 38.1 parts of high-boiling residue. The $C_{17}$ ketone fraction consists of a mixture of heptadecanone-7 and heptadecenone-7, as indicated by analysis for iodine number. The presence of saturated ketone in this product is accounted for by the saturation of the double bond that occurs simultaneously with the dehydrogenation of both the primary and secondary hydroxyl groups. This is responsible in part for the low gas evolution as compared to that obtained with octadecanediol-1,12.

Example VI

Two hundred fifty parts of technical grade octadecanediol-1,12 and 12.5 parts of a 5% palladium-on-charcoal catalyst are charged into a reaction flask equipped as shown in Example I. The mixture is heated with stirring to a temperature in the neighborhood of 200° to 225° C., and in this range the evolution of gas begins at a slow steady rate. Heating is continued over a period of about 11 hours, during which time the temperature is gradually raised to a maximum of about 260° C. The total amount of gas evolved is 2.44 moles per mole of octadecanediol treated. The reaction mixture is cooled, the catalyst separated by filtration, and the product worked up by vacuum fractional distillation. There are obtained 141.8 parts of heptadecanone-7, B. P. 152° to 154° C. at 3 mm. This corresponds to an 81% conversion, based on the octadecanediol content of the starting material.

Example VII

One hundred fifty parts of octadecanediol-1,12 and 15 parts of nickel-on-kieselguhr catalyst are charged into a high pressure autoclave. The autoclave is sealed and heated at a temperature of 250° C. for a period of 8 hours. At the end of this time the autoclave is cooled to about 150° C. and accumulated gases purged until the internal pressure is approximately atmospheric. Hydrogen under 1500 lbs. per sq. in. pressure is forced into the autoclave and heating at 150° to 175° C. is continued for 3 to 4 hours. During this period hydrogen is absorbed at a steady rate and fresh amounts are added from time to time in order to maintain the total pressure in excess of about 500 lbs. per sq. in. The autoclave is cooled and the product removed and separated from the catalyst by filtration. Fractional distillation of the filtered product gives 89.2 parts of a main fraction, B. P. 154° to 156° C. at 3 mm., M. P. 45° C., which comprises essentially pure heptadecanol-7. The yield is 85% of theory, calculated on the total amount of pure octadecanediol-1,12 in the starting material. Analysis of the product gave: carbon, 79.71; hydrogen, 13.98.

$C_{17}H_{36}O$ requires: carbon, 79.65; hydrogen, 14.07.

Example VIII

Three hundred fifty parts of copper chromite catalyst is mixed with 3500 parts of castor oil and the mixture placed in a steel high pressure autoclave equipped with an efficient agitator and a device for sampling the charge. The autoclave is sealed and the contents brought to a temperature of 260° C. under a hydrogen pressure of about 3000 lbs. per sq. in. Under these conditions hydrogen is absorbed rapidly over a period of 1 to 2 hours. Thereafter the rate of hydrogen absorption slows down, and at the end of 4 hours essentially ceases. During this period fresh hydrogen is admitted at intervals in order to maintain the total pressure in the range of 2500 to 3000 lbs. per sq. in. When the reduction of both the double bond and carboxyl group of ricinolein is complete, as indicated by failure to adsorb further amounts of hydrogen, the autoclave and its contents are cooled to 250° C., the pressure is reduced to about 500 lbs. per sq. in., and a small sample of the product removed through the sampling device. This material is slurried with 300 parts of nickel-on-kieselguhr catalyst and the resulting mixture pumped back into the autoclave slowly while continuing to operate the agitator. After all the nickel catalyst has been added, the reaction mixture is heated at 250° C. for a period of 8 hours under a pressure of approximately 400 to 500 lbs. per sq. in. This pressure is maintained by purging gas from the autoclave occasionally during the heating period. Thereafter, the autoclave is cooled to below 100° C. and the charge removed and filtered to separate the catalyst. The filtered product is refined by vacuum fractional distillation in an efficient still. There are obtained a main fraction comprising 1826 parts of heptadecanone-7, B. P. 152° to 154° C. at 3 mm., which is identical with the heptadecanone-7 described in the foregoing examples.

*Example IX*

One hundred fifty parts of castor oil, 15 parts of copper chromite catalyst, and 15 parts of nickel catalyst are mixed thoroughly and charged into a small high pressure hydrogenation vessel. The autoclave and its contents are brought to a temperature of 250° to 260° C. under a hydrogen pressure of about 3000 lbs. per sq. in. Under these conditions hydrogen is absorbed and the heating is continued until no further absorption of hydrogen indicates complete reduction of the double bond and carboxyl group of the castor oil. This requires about 3 to 4 hours. At the end of this period the pressure in the autoclave is reduced to about 500 lbs. per sq. in. and the heating is continued at 250° C. for an additional 7 to 8 hours. Thereafter the autoclave is cooled further to a temperature of about 150° C. and accumulated gases removed by purging down to atmospheric pressure. The autoclave is then subjected to a hydrogen pressure of approximately 1500 lbs. per sq. in. at a temperature of 150° to 175° C. Heating is continued until no further absorption of hydrogen is noted, which indicates complete hydrogenation of the ketone produced in previous stages of the reaction. The product is removed from the cooled autoclave, filtered to separate the catalyst, and finally purified by vacuum fractional distillation. There are obtained 81.7 parts of a fraction, B. P. 154° to 156° C., M. P. 45° to 46° C., which is identical with the heptadecanol-7 described in Example VII.

Although in the foregoing examples we have indicated the use of certain definite conditions of temperature, pressure, reaction times, catalyst, concentrations of reactants, and the like, it is to be understood that these values can be varied somewhat within the scope of this invention.

Broadly speaking, our process for converting primary-secondary glycols to ketones containing one less carbon atom than the parent material involves two separate and distinct reactions which proceed essentially simultaneously under the same conditions over the same catalyst. The first reaction is one of dehydrogenation which may proceed in accordance with the following equation:

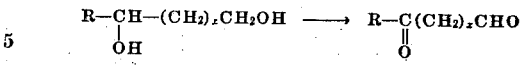

The second reaction involves elimination of a molecule of carbon monoxide from the ketoaldehyde produced by dehydrogenation.

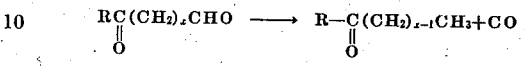

It is obvious that since both reactions occur under essentially the same conditions that the aldehyde products may exist only momentarily in contact with the dehydrogenation catalyst.

Generally speaking, the dehydrogenation-decarbonylation process of this invention is carried out at temperatures in excess of about 150° C. and preferably at temperatures in the range of 180° to 265° C. The reaction can be conducted either at atmospheric pressure or under superatmospheric hydrogen pressures, preferably in the range from 300 to 500 lbs. per sq. in.

In the dehydrogenation step there may be used any liquid phase dehydrogenating catalyst which effects liberation of hydrogen from primary and secondary carbinol groups in preference to dehydration. These catalysts are metals of group VIII of the periodic table and may be used alone or in various combinations. These catalysts may be used either in the form of their oxides or as finely divided metal powders either in the massive state or deposited on suitable porous, easily suspended supports such as kieselguhr, pumice, and the like. As one of the preferred catalysts of the invention might be mentioned nickel-on-kieselguhr. Catalysts coming within this classification also function as hydrogenation catalysts in the step of converting the ketone to the alcohol. This reaction may be carried out in situ merely by changing the conditions to those which favor hydrogenation of the ketone carbonyl group. For example, a temperature of about 150° to 175° C. and pressure exceeding about 1500 lbs. per sq. in. can be employed conveniently.

The process of this invention is applicable to primary-secondary glycols in which the primary carbinol group is separated from the secondary carbinol group by at least two carbon atoms in contiguous relation. Examples of this class of compounds include ricinoleyl alcohol, which is produced by sodium reduction of castor oil, octadecanediol-1,12 which is formed by catalytic hydrogenation of castor oil or 12-hydroxystearin, or the glycols produced by catalytic hydrogenation of other hydroxy carboxylic compounds including 10-hydroxystearin, 10-hydroxypalmitin, and the like.

As pointed out above, an important modification of the process involves producing the glycols in situ by catalytic hydrogenation of compounds containing a secondary carbinol group separated by at least two carbon atoms in contiguous relation from another group capable of hydrogenation to a primary carbinol group. Examples of such compounds are hydroxy acids, hydroxy glycerides, other hydroxy esters, or hydroxy aldehydes having the hydroxyl group on a carbon other than the terminal carbon atom. All of these materials are converted in good yields to primary-secondary glycols by hydrogenation according to the processes described in U. S. Patents 2,094,611 and 2,079,414. A glyceride such as castor oil, for example, may be charged into a hydrogenation autoclave and treated with hydrogen under pressures up to about 3000 lbs. per sq. in. at temperatures in the neighborhood of 250° to 275° C. in the presence of a copper chromite catalyst. Under these conditions the double bond is completely saturated and the carboxyl group undergoes reduction smoothly to a primary carbinol group. In general, the carboxyl reduction catalyst employed in the step of converting the glyceride to the glycol has little effect on subsequent steps of the process. The dehydrogenation-decarbonylation reaction may be carried out without isolating the primary-secondary glycol produced in this manner by adding the required amount of dehydrogenation catalyst and treating under the conditions described above. Finally, the ketone obtained in the dehydrogenation-decarbonylation step can be conveniently hydrogenated in situ to the corresponding secondary alcohol, using the same catalyst employed in the decarbonylation step.

The process of this invention provides a novel and highly effective catalytic method for preparing a wide variety of ketones and alcohols hitherto unknown or unavailable except in small quantities as laboratory reagents. The process provides a practicable commercial route for the preparation of heptadecanone-7 and heptadecanol-7 and other ketones or alcohols derivable from naturally occurring raw materials such as castor oil and oiticica oil. The ketones and alcohols of this invention are of especial interest as intermediates for surface-active agents, wax blending agents and the like.

Having described in detail the preferred embodiments of our invention, it is to be understood that we do not limit ourselves to the specific embodiments thereof except as defined in the following claims.

We claim:

1. The process which comprises catalytically hydrogenating an ester of a hydroxy acid having at least two carbon atoms in contiguous relation between the hydroxyl group and the ester group and having the hydroxyl group attached to a carbon other than the terminal carbon atom under conditions that will convert the ester group to a carbinol group, heating the resulting diol while in contact with a dehydrogenation catalyst at a temperature in excess of about 150° C. until the evolution of gas ceases, thereby forming a ketone having one less carbon atom than the diol and then catalytically hydrogenating the ketone to the corresponding alcohol.

2. The process which comprises catalytically hydrogenating an ester of a hydroxy acid having at least two carbon atoms in contiguous relation between the hydroxyl group and the ester group and having the hydroxyl group attached to a carbon other than the terminal carbon atom under conditions that will convert the ester group to a carbinol group, continuing the hydrogenation in order to saturate any unsaturated carbon-to-carbon linkages, heating the resulting diol while in contact with a dehydrogenation catalyst at a temperature in excess of about 150° C. until the evolution of gas ceases, thereby forming a ketone having one less carbon atom than the diol and then catalytically hydrogenating the ketone to the corresponding alcohol.

3. The process which comprises catalytically hydrogenating an ester of a hydroxy acid having at least two carbon atoms in contiguous relation between the hydroxyl group and the ester group and having the hydroxyl group attached to a carbon other than the terminal carbon atom under conditions that will convert the ester group to a carbinol group, heating the resulting diol while in contact with a dehydrogenation catalyst at a temperature in excess of about 150° C. until the evolution of gas ceases, thereby forming a ketone having one less carbon atom than the diol.

4. The process which comprises heating a primary-secondary glycol having at least two carbon atoms in contiguous relation between the primary and secondary carbinol groups while in contact with a dehydrogenation catalyst at a temperature in excess of about 150° C.

5. The process which comprises heating a primary-secondary glycol having at least two carbon atoms in contiguous relation between the primary and secondary carbinol groups while in contact with a dehydrogenation catalyst at a temperature within the range of 180° to 265° C. until the evolution of hydrogen ceases, thereby forming a ketone having one less carbon atom than the primary-secondary glycol.

6. The process which comprises heating a primary secondary glycol having at least two carbon items in contiguous relation between the primary and secondary carbinol groups while in contact with a dehydrogenation catalyst at a temperature in excess of about 150° C. until the evolution of gas ceases, thereby forming a ketone having one less carbon atom than the diol and then catalytically hydrogenating the ketone to the corresponding alcohol.

7. The process which comprises catalytically hydrogenating castor oil under conditions that will convert the ester radical contained therein to a carbinol group and saturate the ethylenic double bond, heating the resulting octadecane-diol-1,12 while in contact with a dehydrogenation catalyst at a temperature in excess of about 150° C. Until the evolution of gas ceases, thereby forming heptadecanone-7, and then catalytically hydrogenating the heptadecanone-7 to heptadecanol-7.

8. The process which comprises catalytically hydrogenating castor oil under conditions that will convert the ester radical contained therein to a carbinol group, heating the resulting diol while in contact with a dehydrogenation catalyst at a temperature in excess of about 150° C. until the evolution of gas ceases, thereby forming heptadecanone-7.

9. The process which comprises heating octadecanediol-1,12 while in contact with a dehydrogenation catalyst at a temperature in excess of about 150° C.

10. The process which comprises heating octadecanediol-1,12 while in contact with a dehydrogenation catalyst at a temperature within the range of 180° to 265° C. until the evolution of gas ceases, thereby forming heptadecanone-7.

11. The process which comprises heating octadecanediol-1,12 while in contact with a dehydrogenation catalyst at a temperature in excess of about 150° C. until the evolution of gas ceases, thereby forming heptadecanone-7, and then catalytically hydrogenating heptadecanone-7 to heptadecanol-7.

12. A 17 carbon oxygenated straight chain aliphatic compound having the oxygen atom attached to the seventh carbon and selected from the class consisting of alcohols and ketones.

13. Heptadecanone-7.

14. Heptadecanol-7.

15. The process in accordance with claim 1 characterized in that the dehydrogenation catalyst contains as an active catalytic component a metal of group VIII of the periodic table.

16. The process in accordance with claim 1 characterized in that the dehydrogenation catalyst contains nickel as an active catalytic compound.

17. The process in accordance with claim 1 characterized in that the dehydrogenation catalyst contains palladium as an active catalytic component.

18. The process in accordance with claim 5 characterized in that the dehydrogenation catalyst contains as an active catalytic component a metal of group VIII of the periodic table.

19. The process in accordance with claim 5 characterized in that the dehydrogenation catalyst contains nickel as an active catalytic component.

20. The process in accordance with claim 5 characterized in that the dehydrogenation catalyst contains palladium as an active catalytic component.

BENJAMIN W. HOWK.
WILBUR A. LAZIER.

CERTIFICATE OF CORRECTION.

Patent No. 2,247,756. July 1, 1941.

BENJAMIN W. HOWK, ET AL.

It is hereby certified that error appears in the printed specification of the above numbered patent requiring correction as follows: Page 1, second column, line 47, for "$C_{17}H_{34}$" read --$C_{17}H_{34}O$--; page 4, second column, line 25, claim 6, for the word "items" read --atoms--; line 40, claim 7, for "150° C. Until" read --150° C. until--; page 5, first column, line 5-6, claim 16, for "compound" read --component--; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.